Dec. 25, 1934.                S. CELINSKI                1,985,817
MICROSCOPIC SLIDE EDGING AND SMOOTHING MACHINE
Filed July 6, 1933              3 Sheets-Sheet 1
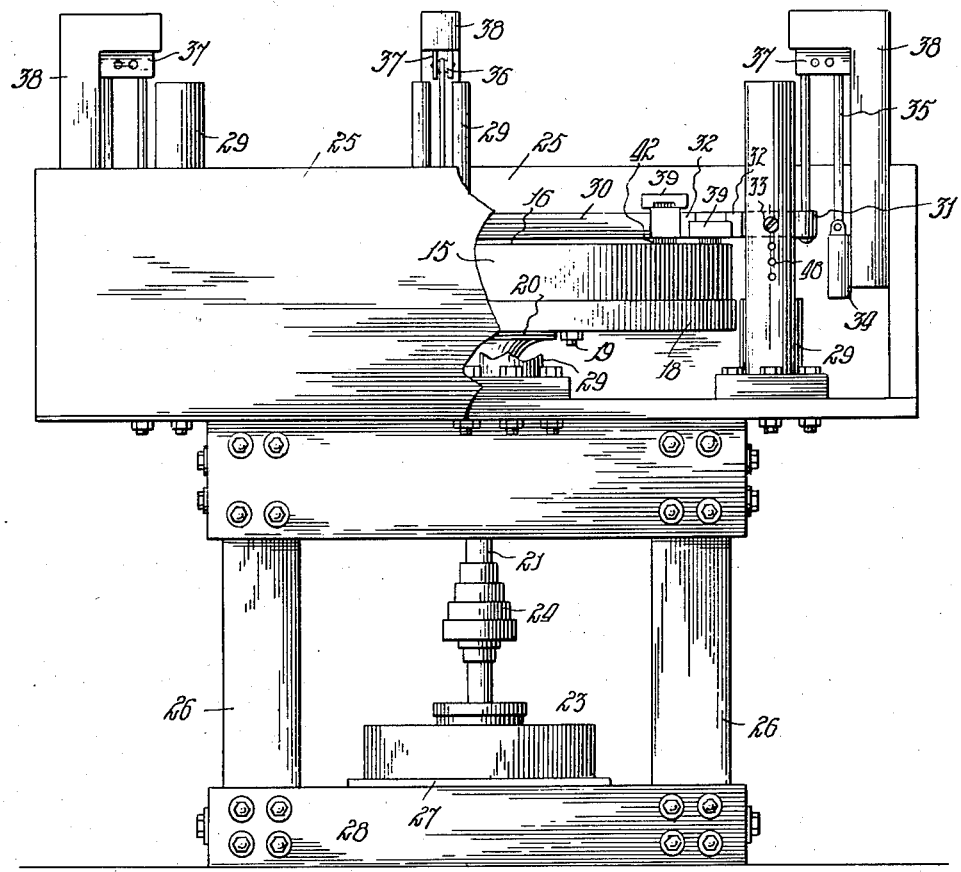
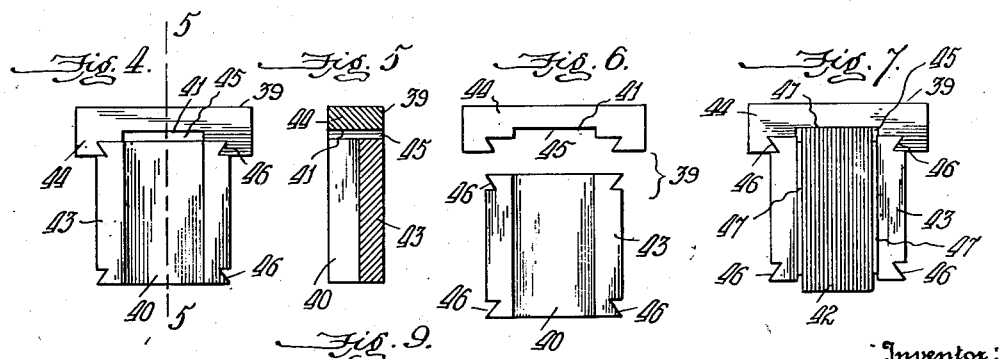

Dec. 25, 1934. S. CELINSKI 1,985,817
MICROSCOPIC SLIDE EDGING AND SMOOTHING MACHINE
Filed July 6, 1933 3 Sheets-Sheet 2
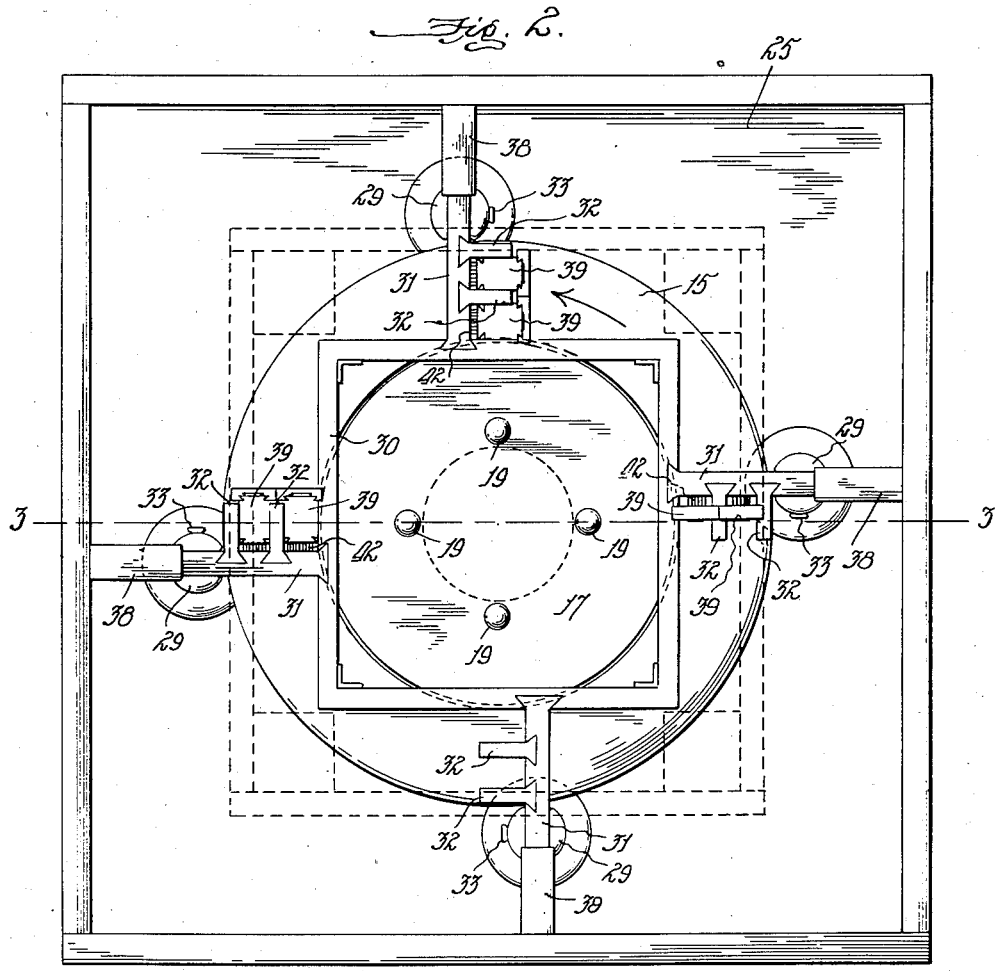
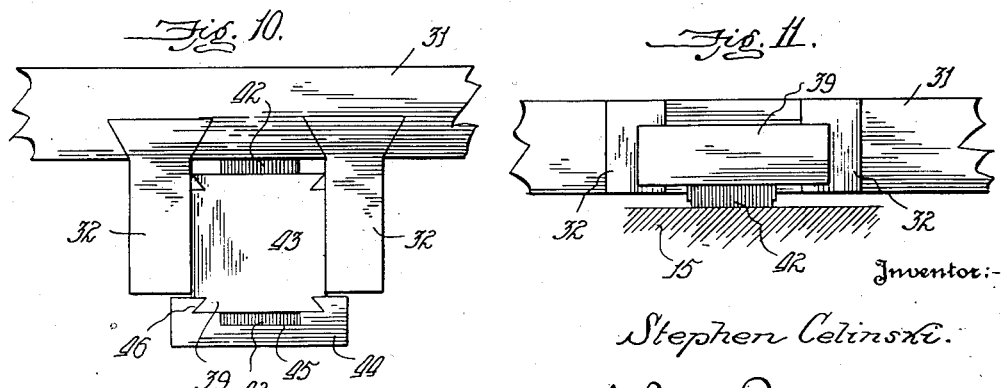
Inventor:-
Stephen Celinski.
By John B. Thomas Co.
Attorneys.

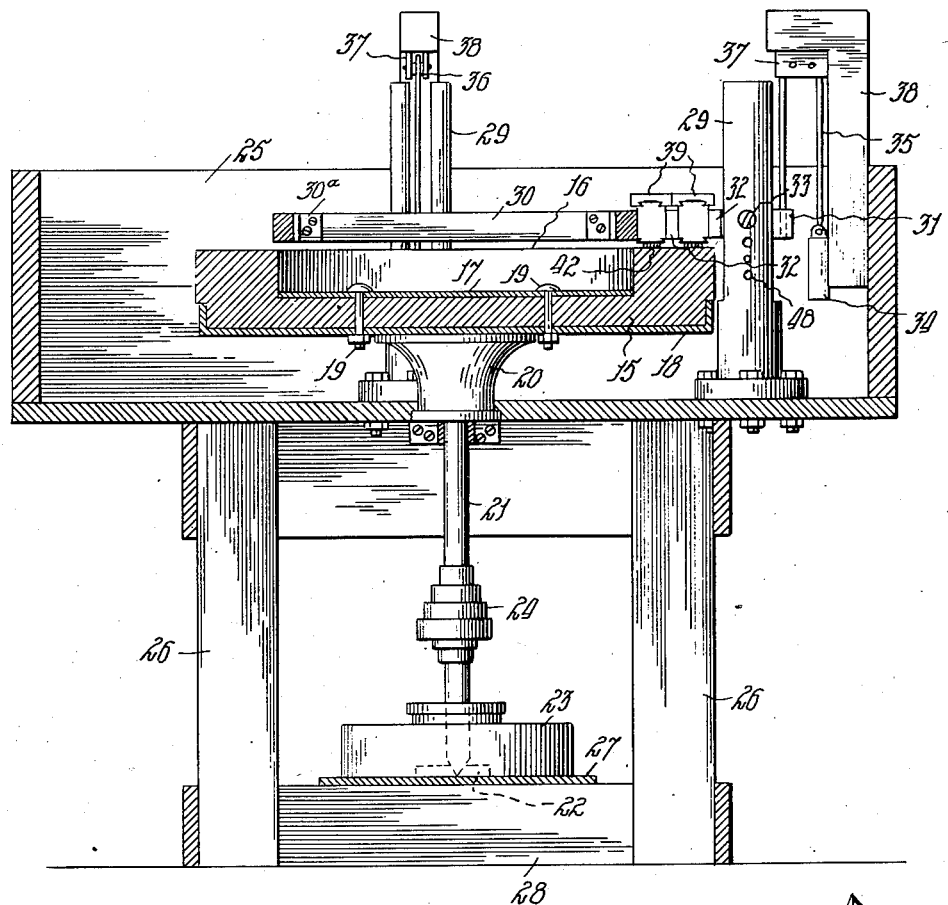
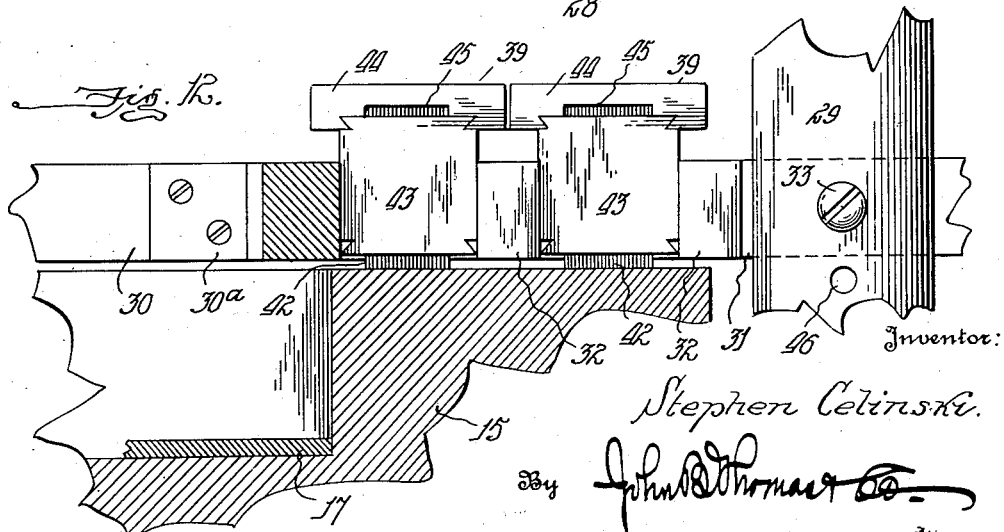

Patented Dec. 25, 1934

1,985,817

UNITED STATES PATENT OFFICE 1,985,817

MICROSCOPIC SLIDE EDGING AND SMOOTHING MACHINE

Stephen Celinski, Buffalo, N. Y.

Application July 6, 1933, Serial No. 679,232

5 Claims. (Cl. 51—125)

My invention relates to the art of smoothing and polishing glass, and has particular reference to a machine for smoothing the edges of glass slides used in connection with microscopes and upon which the specimen or subject-matter to be investigated is placed.

The primary object of my invention is to provide a machine of this general character which will facilitate the operation of abrading or smoothing the edges of glass plates or slides by employing boxes in which a large number of the plates or slides are grouped, said boxes being adapted for use in association with a frame or gauge device by means of which the plates or slides, firmly held in the boxes, are supported thereby for the action of a revolving horizontal stone or abrading element.

A further object of my invention is to so construct the box-like holder for the microscopic slide glasses whereby said box is not only adapted for convenient application to the supporting frame or gauge device but may be also used for holding the group of glass plates against the stone by hand.

With these principal objects in view an important feature of my invention contemplates the provision of a box or holder in the form of a block having a recess in one side thereof to receive a plurality of glass slides grouped side by side and held in place by wedges, the said recess opening out at one end of the box or block so that the group of glass slides contained therein will project beyond the end of the box and at one side thereof for the grinding action of the stone or abrading element, it being desirable that the box be made in two connected parts comprising a head piece and body portion so that the head piece may be connected to either end of the body portion for exposing the edges at either end of the glass slides as well as one of the longitudinal edges thereof.

My invention further consists in providing a supporting frame or gauge device, cooperating with several of the boxes and grinding or smoothing stone, as a part of the machine for smoothing the edges of glass plates or microscopic slides, said gauge device comprising a frame for holding the boxes containing the glass plates, and means for adjusting the frame with respect to the surface of the stone or abrading element employed for smoothing the edges of the plates or slides, all as hereinafter fully described and more specifically set forth in the claims.

In the accompanying drawings illustrating the preferred embodiment of my invention:—

Fig. 1 is a side elevation of a machine for smoothing the edges of glass plates or slides in accordance with my invention, part of the main frame being broken away.

Fig. 2 is a plan view of the machine.

Fig. 3 is a vertical sectional view on the line 3—3 of Fig. 2.

Fig. 4 is a detail view, enlarged, of the box in front elevation.

Fig. 5 is a vertical sectional view through the same on the line 5—5 of Fig. 4.

Fig. 6 is a detail view of the two-part box separated.

Figs. 7, 8, and 9 are views of the box with a group of glass plates secured therein.

Figs. 10 and 11 are enlarged detail views illustrating the application of the boxes to the supporting element or gauge device of the machine, and Fig. 12 is a similar view and including the abrading stone as well as one of the posts by which the gauge device is adjustable in its relation to the stone.

The elements of construction constituting my invention are usable in connection with a horizontal grinding stone or abrading element to which a revolving motion is imparted, the stone 15 shown in the drawings being cut out centrally to present an annular grinding surface 16 against which the edges of the glass plates or microscopic slides are held for smoothing the same, the said stone being clamped between upper and lower plates 17 and 18 by bolts 19 and having a hub 20 at the center of the lower plate 18 to which the driving shaft 21 is fixed with the lower end of said shaft stepped in a bearing 22 at the bottom of an oil pan 23. The shaft is driven from the source of power by a belt (not shown) passing around the differential pulleys 24, and for supporting the stone and driving shaft there is a box-like main frame 25 supported by four legs 26 between which the driving shaft for the stone depends into the oil pan 23 supported by crosspiece 27 bridging the braces 28 at the lower ends of the legs.

As will be noted by reference to the drawings, there is a space between the periphery of the stone and sides of the box-like main frame for the location of posts 29 which rise from the bottom of said main frame adjoining the periphery of the stone for the purpose of supporting the gauge device by which the microscopic glass slides are held against the upper surface of the stone.

The gauge device consists of a square frame 30 from the sides of which arms 31 project, slightly off center as shown in Fig. 2, and are slidable in the posts for which purpose the upper portion of each post is bifurcated, and it will be obvious that the frame and arms are held stationary while the stone revolves beneath the same. It will also be observed that the size of the square frame 30 is such that the arms 31 extend across the upper surface of the stone to the posts adjoining the periphery thereof, and although I have shown four arms the number may be increased and the shape of the square frame modified accordingly, that is to say an octagonal frame would provide for eight arms and in that case additional posts would be provided. The arms 31 are intended to support the glasses on the surface of the stone and said arms are therefore provided with fingers or short rods 32, 32 between which the boxes, hereinafter described, are held, and to hold the gauge device in proper position with relation to the stone set screws 33 are threaded through one side of each post to engage the arm slidable therein, while to counterbalance the weight of said gauge device counterbalancing weights 34 are employed and connected by ropes or cables 35 to the outer ends of the arms after passing over rollers 36 supported in brackets 37 at the upper ends of bracket arms 38 suitably secured to the side pieces of the main frame of the machine.

For holding the glass plates or slides in the gauge device between the fingers or short rods 32 of the arms 31, and between one of said fingers and the adjacent side of the frame 30, I provide a special form of box illustrated in detail by Figs. 4 to 6 and referred to generally by the numeral 39, said box presenting a recess 40 in one side thereof to receive the glass plates or slides. The recess opens out at one end of the box and the inner end 41 thereof provides an abutment for the inner ends of the glass plates 42, it being understood that the box and recess are of a size with respect to the glass plates or slides to be operated upon that said glass plates or slides when placed in the recess will project beyond the end of the box and beyond one side thereof, as illustrated in Fig. 9. The box is preferably made in two separable parts comprising a body portion 43 having the recess 40 in one side thereof and a head 44 detachably connected to the body portion and having a shallow recess 45 at the inner side thereof as a continuation of the recess in the body portion. These parts of the box may be connected together in any suitable manner for easily separating the same for the purpose hereinafter mentioned, the connection preferred being in the form of a dovetail joint 46. The box for holding the group of glass plates or microscopic slides is preferably made of steel or cast iron and the glass plates or slides placed lengthwise in the recess 40, to bear against the inner end wall 41, are secured in the box by means of wooden wedges 47, 47 at opposite sides of the group (see Fig. 7), and when the edges at the projecting end and side of the plates have been ground the head 44 may be transferred to the other end of the body portion of the box for grinding the edges at the other end of the glass plates. By this arrangement three of the edges of the glass plates may be ground or smoothed without removing the plates from the box, and of course the other longitudinal edge of the glass plates may be ground by reversing the plates in the box or holder. It will thus be seen that the box provides for holding a large number of glass plates, and although it is especially adapted for use in connection with the stationary gauge device located above the stone and having the arms by which several of the boxes and groups of glasses therein are supported for the grinding and smoothing operation of the stone, it will be understood that the box containing the glass slides can be held by hand for the operation of either a horizontal or vertical stone; in other words, the box is adapted for use by hand as well as in the machine described.

In the operation of the machine the stone 15 travels from left to right at approximately 400 R. P. M., and as the fingers on the gauge arms project in the opposite direction from that in which the stone revolves the glass plates in the boxes 39 between the fingers 32 and sides of the supporting frame 30 are pressed against the arms 31 (see Fig. 2), it being noted that the said boxes are positioned horizontally for grinding and smoothing the longitudinal edges of the glass plates and vertically for the end edges. The spaces to receive the boxes in the gauge device are slightly wider than the boxes so that the latter may be easily placed in position, and of course the weight of the boxes and glass slides carried thereby will permit of the required grinding action of the stone. As the stone wears the gauge device can be lowered, for which purpose a series of screw threaded holes 48 to receive the set screws are provided in each post, and should any one or more of the set screws become loose during the operation of the machine the counterbalancing weights will prevent the gauge device from dropping on to the stone and damaging the same. The position of the boxes in the gauge device can be readily changed during the operation of the stone, and by providing several arms having the retaining fingers permits the operator to make the required changes in the position of the boxes as well as substitute other boxes having the glass plates secured therein.

Although I have described the gauge device as being used in connection with a revolving stone having an annular grinding surface it will be understood that any well known abrading element may be employed, as for instance a cast iron wheel coated with fine powdered emery mixed with water, and such a wheel I prefer to use in the first operation on the glass slides, and then use the stone to give the desired gloss and evenly smooth edges. My invention also contemplates other modifications or changes within the spirit and scope of the appended claims.

I claim:

1. A machine for smoothing the edges of glass plates or microscopic slides comprising a revolving abrading element mounted horizontally to present a flat grinding surface, and a stationary gauge device mounted above the abrading element and consisting of a frame, arms projecting outwardly therefrom, spaced apart fingers projecting from the arms in the opposite direction from the rotation of the abrading element, and posts bifurcated at their upper ends to receive the arms for adjustable sliding movement therein; together with means for counterbalancing the gauge device, and boxes carrying the glass plates and adapted to fit between the fingers of the gauge device.

2. A machine for smoothing the edges of glass plates or microscopic slides comprising a revolving abrading element mounted horizontally to present a flat grinding surface, and a stationary gauge device mounted above the abrading element and consisting of a frame, arms projecting outwardly therefrom, spaced apart fingers projecting from the arms in the opposite direction from the rotation of the abrading element, posts bifurcated at their upper ends to receive the outer ends of the arms slidable in said posts, means for holding the frame adjustable on the posts, and counterbalancing weights connected to the outer ends of the arms beyond the posts; together with boxes carrying the glass plates and adapted to fit between the fingers of the gauge device.

3. A box for use in smoothing the edges of glass plates or microscopic slides consisting of a body portion or block having a longitudinal recess in one side extending from end to end of said body portion to receive the glass plates, a detachable head forming one end of the box and having a shallow recess therein corresponding with the recess in the body portion, and means for connecting said head to the body portion of the box.

4. A box for use in smoothing the edges of glass plates or microscopic slides consisting of a body portion or block having a longitudinal recess in one side extending from end to end to said body portion to receive the glass plates, the body portion having dovetailed projections at its opposite ends, and a detachable head for the block having dovetailed recesses to receive the dovetailed projections at either end of the body portion.

5. A box for use in smoothing the edges of glass plates or microscopic slides consisting of a body portion or block having a longitudinal recess in one side extending from end to end of said body portion to receive the glass plates, the body portion having dovetailed projections at its opposite ends, and a detachable head for the block having an intermediate shallow recess corresponding with the recess in the body portion, and dovetailed recesses in said detachable head to receive the dovetailed projections at either end of the body portion.

STEPHEN CELINSKI.